Nov. 20, 1962  J. L. MARKSON ETAL  3,065,419
SERVO ANALYZER
Filed Aug. 19, 1959  4 Sheets-Sheet 1

INVENTORS
JOHN L. MARKSON
LEO B. NOE
FRED V. ANDERSEN
BY *Edward A. Loblaski*
AGENT Nov. 20, 1962

J. L. MARKSON ETAL 3,065,419

SERVO ANALYZER

Filed Aug. 19, 1959

INVENTORS
JOHN L. MARKSON
LOE B. NOE
FRED V. ANDERSEN

BY Edward A. Sokolski

AGENT

INVENTORS
JOHN L. MARKSON
LEO B. NOE
FRED V. ANDERSEN
BY
Edward A. Sokolski
AGENT Nov. 20, 1962  J. L. MARKSON ETAL  3,065,419
SERVO ANALYZER Filed Aug. 19, 1959  4 Sheets-Sheet 4

INVENTORS
JOHN L. MARKSON
LEO B. NOE
FRED V. ANDERSEN
BY
Edward A. Sokolski
AGENT

United States Patent Office 3,065,419
Patented Nov. 20, 1962

3,065,419
SERVO ANALYZER
John L. Markson, Downey, Leo B. Noe, Santa Ana, and Fred V. Andersen, Torrance, Calif., assignors to North American Aviation, Inc.
Filed Aug. 19, 1959, Ser. No. 834,761
17 Claims. (Cl. 324—158)

This invention relates to a servo analyzer and more particularly to a servo analyzer which can accurately indicate the response of a servo system to sine wave inputs.

A servo system may be defined as a device in which a feedback signal from the output of the system is compared with the input to the system to produce an "error" signal. This error signal is used to drive the output into correspondence with the input. Such servo systems are widely used in the art for control purposes and are described in many publications including, for example, Servomechanisms and Regulating System Design by Harold Chestnut and Robert W. Mayer published in 1951 by John Wiley & Sons. Such servo systems generally comprise such devices as electronic amplifiers, motors, and selsyns operating in combination.

In evaluating the performance of servo systems, it is desirable to have an accurate check of the exact response of such systems at various frequencies. With a servo system operating in a precision application, tolerances may be very close, necessitating an extremely accurate check on the system's response. It is often desired that only the response of the system to sine wave inputs of particular frequencies be measured, and that all components in the output other than those at the fundamental frequency of the input test signal be eliminated. In this manner, the true response of the system to a particular sine wave input can be accurately measured without any extraneous signals in the output.

Servo analyzers are available which to some degree eliminate noise signals, offset errors, and harmonics due to system nonlinearities. Most of these, however, fail to eliminate most of the offset voltage and the harmonic components in the output. The device of this invention by effectively eliminating substantially all of the harmonic and D.-C. components in the output provides means for very accurately checking the response of a servo system to sine wave input signals. In addition, the device of this invention utilizes a vector summing network whereby not only the real and imaginary components of the output of the system under test can be obtained but also the vector sum of these components.

The device of the invention accomplishes this end result by separately multiplying the output of the system under test by signals in phase and in quadrature with the test signal, respectively. These multiplied outputs are then separately integrated, the period of integration of these integrators being closely controlled by an interval timer which is responsive to the test signal generator and which controls this integration to an exact integral number of cycles of the input test signal. As will later be shown, such multiplication of the test signal and the output of the system under test and the integration of these multiplied signals for an exact integral number of cycles will produce an output in which all of the D.-C. and harmonically related terms in the output are reduced to bero. As will be pointed out in the mathematical analysis to follow, it is essential that the period of integration be controlled to an exact whole number of cycles to effectively eliminate substantially all of the D.-C. and harmonic components. Integrated outputs are provided which represent separately the real and imaginary components of the output of the system under test. In addition, a vector summing network is provided to produce an output which is the vector sum of these real and imaginary components and these outputs may be compared with the test signal input to determine the exact response of the system.

The device of this invention is readily suited for use with automatic checkout equipment using digital controls such as, for example, the system described in pending patent application, Serial No. 761,107, entitled, "Automatic Functional Test Equipment," Howard A. Topp, Jr., et al., inventors, which was filed on September 15, 1958. For exemplary purposes, the device of the invention will be described in relationship to its function with digital inputs. However, it is to be clearly understood that this servo analyzer is by no means limited to operation with such a digital system and can be used as a separate piece of test equipment wherein test signals are either automatically or manually developed and fed to a system under test and compared with the output of such system.

It is therefore an object of this invention to provide an improved servo analyzer.

It is a further object of this invention to provide a servo analyzer in which substantially all D.-C. and harmonic terms generated in the test device and the system under test are reduced to zero.

It is still a further object of this invention to provide a more accurate means for checking the response of servo systems.

It is still a further object of this invention to provide a servo analyzer which will produce an output accurately representative of the vector sum of the real and imaginary components of the output of the system under test at the frequency of the input test signal.

Other objects of the invention will become apparent from the following description taken in connection with the accompanying drawings, in which FIG. 1 is a block diagram which illustrates the operation of the device of the invention;

Figure 1:
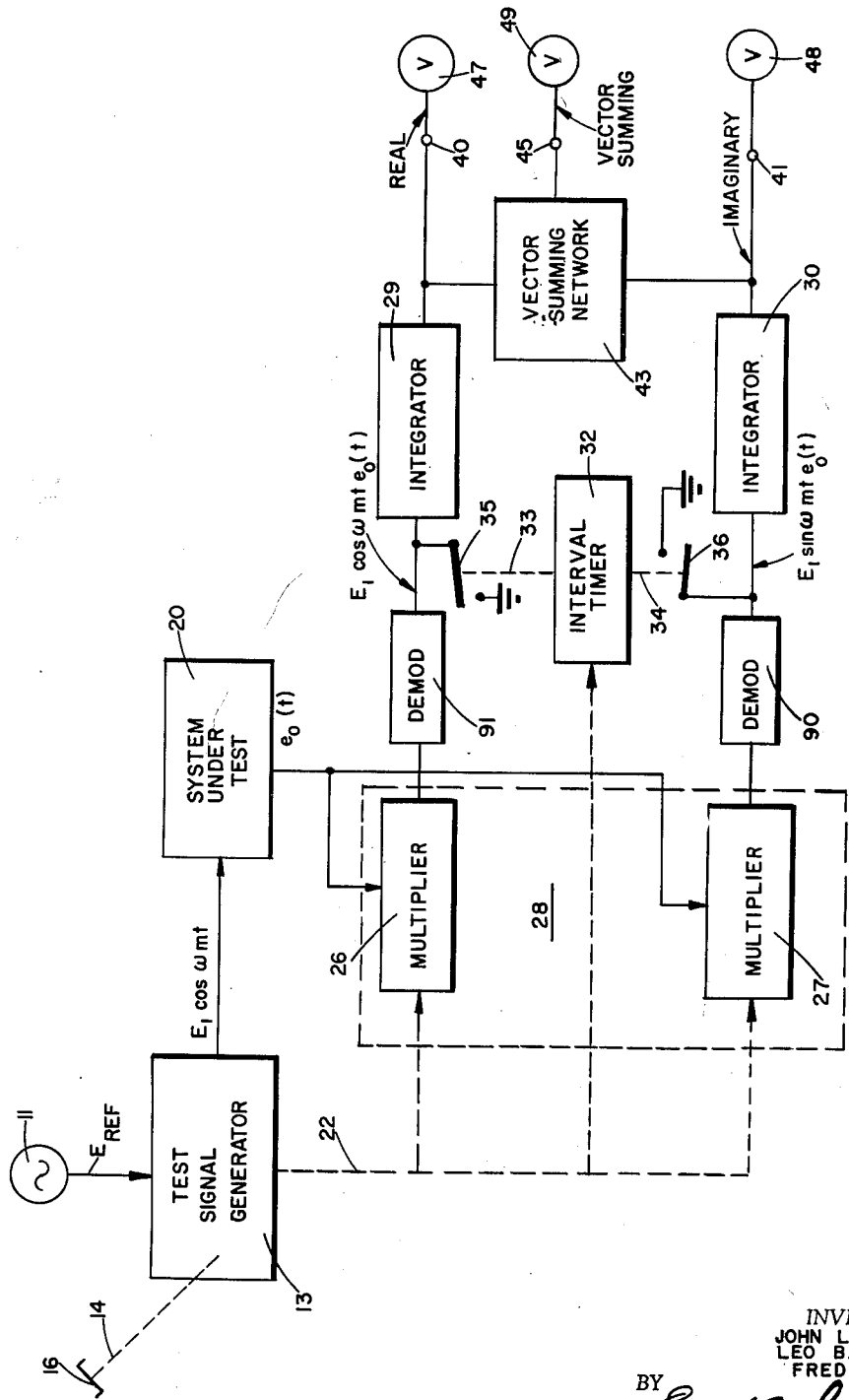

Referring to FIG. 1, a block diagram of the device of the invention is illustrated. An A.-C. reference signal is generated by A.-C. generator 11 and fed to test signal generator 13. This reference signal may be of any suitable frequency such as, for example, 400 cycles and of any desired amplitude to suit test signal requirements. The magnitude and/or frequency of the test signal generated by test signal generator 13 may be manually controlled, as for example, by one or more control shafts 14 and knobs 16 or, as to be illustrated further on in the specification, may be controlled by an electrical control signal which may be in digital form. The test signal generator produces an output which has a modulation component which may be represented by $E_1 \cos \omega_m t$ where $E_1$ is the maximum amplitude and $\omega_m t$ is the angular velocity, $2\pi f_m$ of the modulation component. This signal is modulated upon a carrier which is supplied by A.-C. source 11. The modulation frequency is determined by the positioning of a shaft 14 as controlled by a knob 16 or an input control signal which may be fed to the test signal generator. Thus, the modulation frequency of the test signal may be changed to check the response of the system under test 20 at various frequencies. As will be explained later, the magnitude of this signal may also be controlled by an appropriate attenuator in the test signal generator which may be coupled to shaft 14 or controlled by an appropriate input control signal.

Test signal generator 13 has a mechanical output having the same frequency as and which is in phase with the modulation component, $E_1 \cos \omega_m t$ fed to system 20. This mechanical signal is coupled to shaft 22 which in turn is connecte dto multiplier 26 and multiplier 27 which for illustrative purposes are shown as separate units but which may be part of a single multiplication resolver 28. Multiplier 26 represents what may be a rotor winding of such a multiplication resolver which is mounted so as to be in quadrature electrical relationship with multiplier 27 which represents a second rotor winding of such a resolver. Both of these resolver rotor windings are mechanically coupled to shaft 22. The output of multiplier 26 will therefore be $E_1 \cos \omega_m t \times e_0(t)$ where $E_1 \cos \omega_m t$ represents the output of the test signal generator and $e_0(t)$ represents the output of the system under test 20. On the other hand the output of multiplier 27 will be $E_1 \sin \omega_m t \times e_0(t)$, the output of multiplier 27 being in quadrature with that of multiplier 26. The outputs of multipliers 26 and 27 are fed respectively to demodulators 91 and 90 where the modulation components are extracted from the carrier. These modulation components are then respectively fed to separate integrators 29 and 30.

The integration period of both of these integrators is controlled by interval timer 32 by means of linkages 33 and 34 to switches 35 and 36, respectively. When the predetermined desired period of integration has been completed, switches 35 and 36 will be caused to close and will ground the inputs to integrators 29 and 30 thereby terminating all signal input to these integrators. The period of integration is thereby controlled by interval timer 32 which is in turn controlled by test signal generator 13 and the input thereto. As will be explained in detail later on, the period of integration can be very closely controlled to an exact integral number of cycles of the test signal.

The output of integrator 29 is a direct current which represents the real component of the output of the system under test at the frequency of the test signal while the output of integrator 30 is a direct current which represents the imaginary component of this output. The coefficient of the real component appears at terminal 40 while the coefficient of the imaginary component appears at terminal 41. These signals are D.-C. of either polarity depending upon the test signal and the response of the system under test and are of a magnitude proportional thereto. The outputs of integrators 29 and 30 are also fed to vector summing network 43 which produces the vector sum of these two components. This vector sum is fed to terminal 45 and is always positive, its magnitude alone being determined by the input signal and the response of the system under test.

The outputs of the real and imaginary components may be read by positive-negative reading voltmeters 47 and 48 and the vector sum output may be read by positive reading voltmeter 49. These output voltages, of course, may be fed to an appropriate comparator for comparison with the input signal, the voltage output of the comparator indicating the results of such comparison, or they may be fed to appropriate circuits in automatic checkout equipment for comparison and appropriate analog or digital readout of the results of such comparison.

How the device of this invention eliminates the effect of D.-C. offset and harmonic components in the output of the system under test can best be comprehended by a mathematical analysis of the effects of the multiplication and integration which is accomplished. The output signal, $e_0(t)$ of a non-linear system (such as the system under test may be) as excited by a sine wave input signal will consist of a D.-C. offset component plus sine and cosine terms of the fundamental and harmoic frequencies. $e_0(t)$ can then be expressed by the following equation:

$$e_0(t) = A_0 + A_1 \cos 2\pi f_m t + A_2 \cos 4\pi f_m t + A_3 \cos 6\pi f_m t \ldots + B_1 \sin 2\pi f_m t + B_2 \sin 4\pi f_m t + B_3 \sin 6\pi f_m t \quad (1)$$

where $A_0$ represents the D.-C. component and $A_1$, $A_2$, $A_3$, $B_1$, $B_2$, and $B_3$ represent the maximum amplitudes of the associated cosine and sine wave components. As already noted, $e_0(t)$ is multiplied by $\cos 2\pi f_m t$ and $\sin 2\pi f_m t$ in the multiplication resolver. The results of such multiplication are as follows:

$$e_0(t) \cos 2\pi f_m t = A_0 \cos 2\pi f_m t + A_1 \cos^2 2\pi f_m t$$
$$+ A_2 \cos 4\pi f_m t \cdot \cos 2\pi f_m t + A_3 \cos 6\pi f_m t \cos 2\pi f_m t \quad (2)$$
$$+ B_1 \sin 2\pi f_m t \cos 2\pi f_m t + B_2 \sin 4\pi f_m t \cos 2\pi f_m t \ldots$$

and $$e_0(t) \sin 2\pi f_m t = B_0 \sin 2\pi f_m t + B_1 \sin^2 2\pi f_m t$$
$$+ B_2 \sin 4\pi f_m t \sin 2\pi f_m t + B_3 \sin 6\pi f_m t \sin 2\pi f_m t \quad (3)$$
$$+ A_1 \cos 2\pi f_m t \sin 2\pi f_m t + A_2 \cos 4\pi f_m t \sin 2\pi f_m t \ldots$$

Integration is now performed electronically with an operational amplifier having a gain constant, $K_3$ over an integral number of cycles. $N_c$ represents the integral number of whole cycles of the fundamental component of the input signal which are integrated while $f_m$ is the fundamental frequency of the input test signal. $N_c$ divided by $f_m$ is therefore equal to the time interval of integration, T. The integration of Equation 2 over a time interval, $$\frac{N_c}{f_m}$$

is as follows:

$$K_3 \int_0^{\frac{N_c}{f_m}} e_0(t) \cos 2\pi f_m t \, dt = K_3 \int_0^{\frac{N_c}{f_m}} [A_0 \cos 2\pi f_m t$$
$$+ A_1 \cos^2 2\pi f_m t + A_2 \cos 4\pi f_m t \cos 2\pi f_m t$$
$$+ A_3 \cos 6\pi f_m t \cdot \cos 2\pi f_m t + B_1 \sin 2\pi f_m t \cos 2\pi f_m t$$
$$+ B_2 \sin 4\pi f_m t \cos 2\pi f t \ldots ] dt \quad (4)$$

The right hand side of Equation 4 can easily be evaluated utilizing the following formulas which may be found in a standard table of integrals:

$$\int_0^{\frac{N_c}{f_m}} A \sin (2\pi f_m t) \cos (2\pi f_m t) dt = 0 \quad (5)$$

$$\int_0^{\frac{N_c}{f_m}} A \sin (2\pi f_m t) \sin (n.2\pi f_m t) dt = \int_0^{\frac{N_c}{f_m}} A \cos (2\pi f_m t) \cdot \cos (n.2\pi f_m t) dt = 0 \quad (6)$$

$$\int_0^{\frac{N_c}{f_m}} A \sin (n.2\pi f_m t) \cos (2\pi f_m t) = 0 \quad (7)$$

$$\int_0^{\frac{N_c}{f_m}} A \sin^2 (2\pi f_m t) = \int_0^{\frac{N_c}{f_m}} A \cos^2 (2\pi f_m t) = \frac{A N_c}{2 f_m} \quad (8)$$

It is to be noted that the above formulas only apply where $N_c$ is an integral number of half cycles as will be explained below. Equation 4 may then be simplified to read:

$$K_3 \int_0^{\frac{N_c}{f_m}} e_0(t) \cos 2\pi f_m t \, dt = K_3 \cdot \frac{A_1 N_c}{2 f_m} \quad (9)$$

It thus can be seen that by integrating the product of the output $e_0(t)$ of a non-linear system by a cosine wave of the same frequency as $e_0(t)$ over an integral number of half cycles, all D.-C. and harmonically related terms are reduced to zero. If we let $J_1$ represent the left hand side of Equation 9 and $$T = \frac{N_c}{f_m}$$

then $A_1$ which represents the coefficient of the real component of the system output, $e_0(t)$ can be evaluated as:

$$A_1 = \frac{2 J_1}{K_3 T} \quad (10)$$

The integration of Equation 3 may similarly be simplified as has Equation 4 to produce:

$$K_3 \int_0^{\frac{N_c}{f_m}} e_0(t) \sin 2\pi f_m t \, dt = K_3 \frac{B_1 N_c}{2 f_m} \quad (11)$$

It is to be noted here though that the term $B_0 \sin 2\pi f_m t$ in Equation 3 will not be reduced to zero in the integration process unless integration is over an integral number of whole cycles rather than half cycles because while $$\int_0^{2\pi} B_0 \sin 2\pi f_m t$$

is equal to zero, $$\int_0^{\pi} B_0 \sin 2\pi f_m t \, dt$$

is not. Therefore, while in the case of the extraction of the coefficient of the real component, to eliminate all undesired signals, it is necessary to integrate only over an integral number of half cycles, to obtain this desired end result in extracting the coefficient of the imaginary component requires integration over an integral number of whole cycles. To facilitate the mechanization, integration of both components is accomplished over a whole number of cycles, although this obviously is not necessary for the real component.

If the left hand side of Equation 11 is set equal to $J_2$ and $$\frac{N_c}{f_m}$$

is represented by T which is the time interval of integration then:

$$B_1 = \frac{2 J_2}{K_3 T} \quad (12)$$

$B_1$ in this case represents the coefficient of the imaginary component at the fundamental frequency of the output signal. Thus, by multiplying the two waves and integrating this product over an integral number of whole cycles it can be seen that all the D.-C. and harmonically related terms are reduced to zero.

Figure 2:
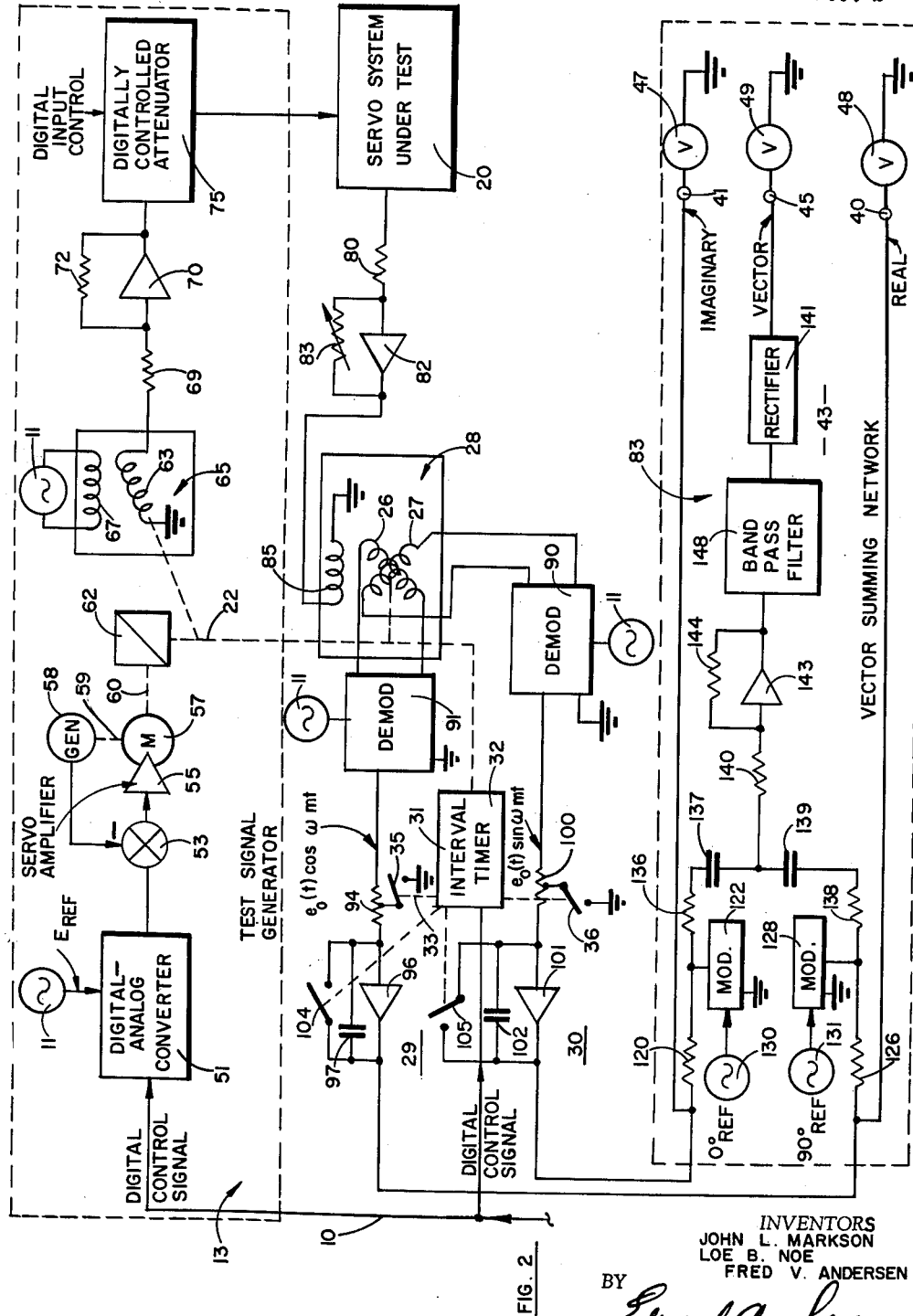
FIG. 2 is a block diagram showing the details of a preferred embodiment of the device of the invention.

Referring now to FIG. 2, the details of a preferred embodiment of the device of the invention are illustrated. In this embodiment, a digitally controlled device is illustrated as, for example, might be utilized in a digitally controlled automatic checkout system such as described in the aforementioned pending application Serial No. 761,107. Such digital control, however, is only exemplary of one means of control which may be utilized and the device of this invention may be utilized with other types of automatic controls or manually operated controls.

A digital input control signal is fed on input line 10 to digital-analog converter 51 in test signal generator 13. A reference signal is fed from A.-C. reference source 11 to digital-analog converter 51 to provide the voltage to be controlled by the digital input signal. The output of digital-analog converter 51 which is an A.-C. voltage proportional in amplitude to the digital input control signal is fed to summing device 53 and thence to servo-amplifier 55 which provides drive voltage for servo-motor 57. Motor 57 is driven at a speed proportional to the input voltage fed thereto; hence, the magnitude of the voltage output of digital-analog converter 51 determines the speed of rotation of motor 57. Motor 57 is mechanically coupled by means of drive shaft 59 to tachometer generator 58. The output of tachometer generator 58, which is an A.-C. electrical signal proportional to the speed of rotation of this generator, is fed in phase opposition relationship with the signal from digital-analog converter 51 to summing device 53. Summing device 53 thus has as its output the difference between the output of digital-analog converter 51 and the signal from tachometer generator 58, this difference or "error" signal being the input to servo amplifier 55. This error signal is closely proportional to the desired rotation speed as indicated by the digital control signal, tachometer 58 providing a negative feedback loop which linearizes the response of the servo amplifier 55 and motor 57.

The mechanical output of motor 57 is fed by means of drive shaft 60 to precision gear train 62. Gear train 62 steps down the rotational motion received from shaft 60 to produce a desired output proportional thereto at shaft 22. Shaft 22 is mechanically coupled to the rotor winding 63 of resolver 65. A reference voltage is fed from A.-C. reference source 11 to stator winding 67 of resolver 65. The signal across winding 63, which varies in amplitude with the rotation of this winding and which has a frequency equal to that of the signal fed to winding 67 from A.-C. source 11, is fed to isolation amplifier 70 through resistor 69. Negative feedback is provided in this amplifier by means of resistor 72. The signal fed to amplifier 70 has a carrier of the frequency of the output of reference source 11 which is modulated at a frequency which is determined by the speed of rotation of winding 63 which in turn is responsive to the digital input signal to digital-analog converter 51. It is to be noted that the same reference source 11 which is represented in FIG. 2 by several separate symbols is commonly used for digital-analog converter 51, resolver 65, and demodulators 90 and 91.

The output of isolation amplifier 70 is fed to digitally controlled attenuator 75. Attenuator 75 is utilized to set the level of the signal fed to the servo system under test 20 to an acceptable point. This attenuator may be automatically controlled by a digital input, may be controlled by other automatic control means, or may be manually controlled. Digital control means, such as that used for the digital analog converter 51, which is illustrated in detail in FIG. 3 and is explained further on the specification, may be utilized if so desired.

The output of servo system 20 (which as noted may be any system using feedback control as, for example, described in the aforementioned publication by Chestnut and Mayer) is fed through resistor 80 to isolation amplifier 82. The gain of amplifier 82 may be controlled by potentiometer 83, whose movable arm may be set to produce the desired output either manually or by automatic control. The output of amplifier 82 is fed to stator winding 85 of multiplication resolver 28. The rotor windings 26 and 27 of multiplication resolver 28 are arranged normal to each other so as to have outputs in electrical quadrature relationship. Both of these windings are mechanically coupled to shaft 22 which moves in accordance with the motion of motor 57 which in turn is responsive to the digital input control signal to test signal generator 13. Control windings 26 and 27 will therefore be rotated at an angular velocity which is proportional to the input test signal and which is the same as the rotation of rotatable winding 63. Both of these windings will therefore have signals across them which are modulated as a function of a sine or a cosine wave of the same frequency as the signal fed to the servo system under test 20. It is to be noted, however, that the modulation component of the output of winding 26 will be in quadrature with that of winding 27 due to the right angle physical relationship of these windings.

The output of winding 27 is fed to synchronous demodulator 90 while the output of winding 26 is fed to synchronous demodulator 91. Both of these demodulators derive their reference voltage from the same source of supply 11 utilized as the reference source for digital-analog converter 51 and for resolver 65. These demodulators may, for example, be transistor switching circuits as described in an article by R. L. Bright, entitled "Junction Transistors Used As Switches," which appeared in the AIEE Transactions for March 1955. A demodulator as shown in FIGURE 25 on page 120 of this issue of the Transactions will operate satisfactorily in this application. Of course, any other synchronous demodulator may be utilized if so desired. The output of demodulator 91, which is described by Equation 2, is fed through tapped resistor 94 to integrating amplifier 29. Amplifier 96 of this integrator 29 is a voltage amplifier having a feedback capacitor 97 which provides negative feedback between its output and input to form a Miller integration circuit. Such Miller type electronic integrators are widely described in the analog computer literature and can readily be designed by reference to such literature to meet application requirements. A description of electronic integrators may be found, for example, in Electronic Analog Computers by Korn and Korn which was published by McGraw-Hill Company in 1956 (see especially pages 175–184).

The output of demodulator 90, which is described by Equation 3, is fed through tapped resistor 100 to integrating amplifier 30 which is comprised by voltage amplifier 101 and feedback capacitor 102 running from the output of this amplifier to its input. Integrator 30 is similar to integrator 29 being an electronic integrator of the Miller type.

Figure 4:
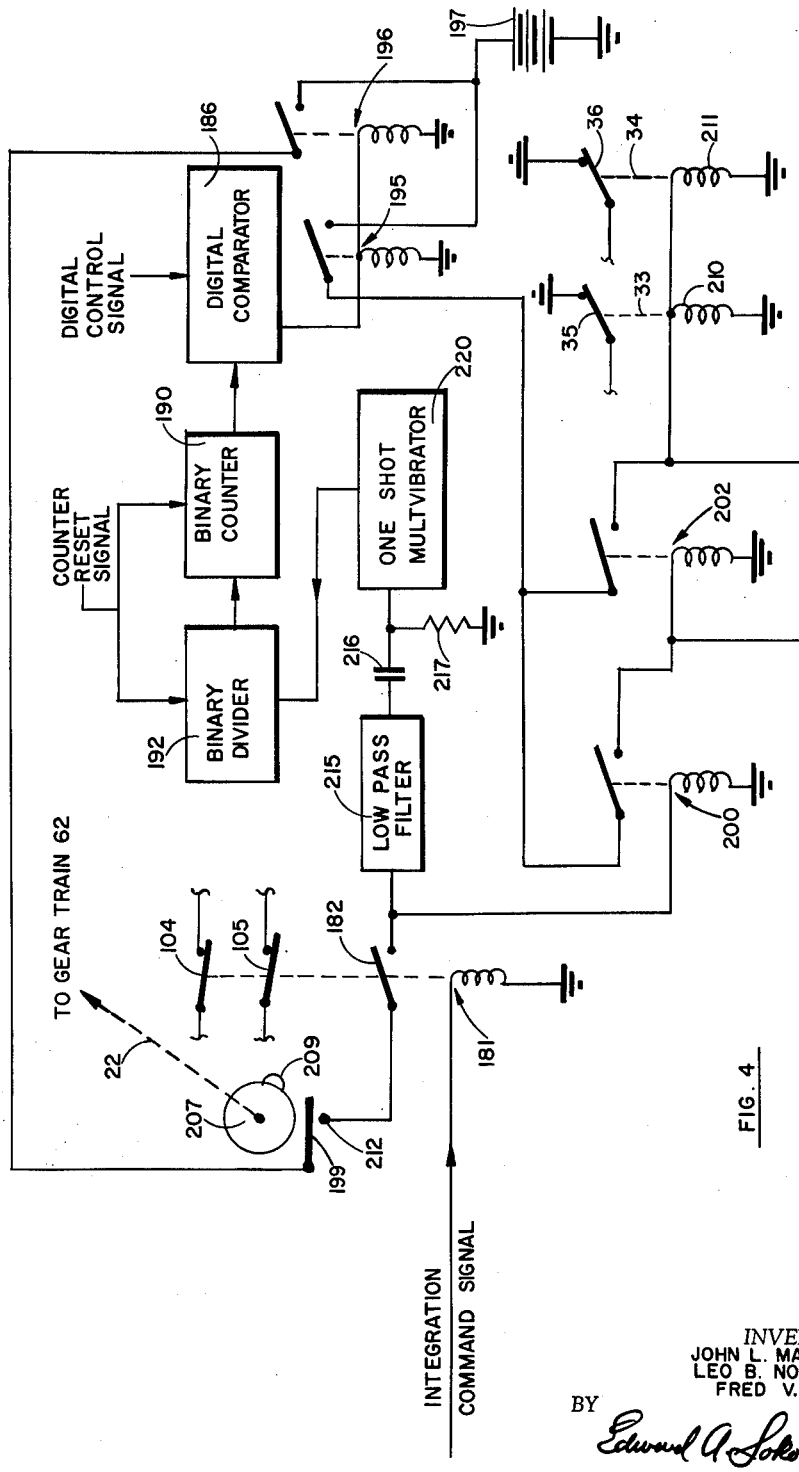
FIG. 4 is a diagram of an interval timer which may be used in the device of this invention.

The period of integration of both integrators 29 and 30 is precisely controlled by interval timer 32. Immediately prior to the commencement of integration, capacitors 97 and 102 are discharged by switches 104 and 105, respectively. Such discharge is necessary to eliminate any residual charges that may remain in these capacitors and thereby to assure precise integration over the desired integration period. These switches may be the contacts of a relay located within interval timer 32 and controlled by a control signal fed to the timer. Interval timer 32 also has other relays (whose operation will be explained in detail further on in the specification) with contacts 35 and 36 and contact linkages 33 and 34 respectively. In response to signals fed to interval timer 32, both of these contacts are shorted to ground at the end of the desired period of integration which is a predetermined whole number of cycles of the modulating test signal. Interval timer 32 is mechanically coupled to shaft 22, rotation of which is responsive to the modulating voltage which provides the test signal. Shaft 22 provides the necessary control signal to enable the interval timer to open and close contacts 35 and 36 at the proper times. A digital control signal which is the same as that fed to digital-analog converter 51 is fed on input line 10 to interval timer 32 to control its operation. The details of the functioning of interval timer 32 which is illustrated in FIG. 4 will be explained in detail further on in the specification with reference to this figure.

The output of integrating amplifier 29 is a direct current of an amplitude and polarity representative of the real component of the fundamental output of the system under test. This output is fed to terminal 40 and may be measured by positive-negative reading voltmeter 48 or may be fed to appropriate comparison and readout circuitry for processing. The output of integrating amplifier 30, which represent the imaginary component of the fundamental frequency output of the system under test, is fed to output terminal 41 and to positive-negative reading voltmeter 47. This signal, which has a magnitude and polarity representative of the response of the servo system under test, may also be fed to appropriate processing circuitry.

Vector summing network 43 provides means for summing these real and imaginary components to obtain a signal representative of the magnitude of the vector sum thereof. The real component of the signal from integrator 30 is fed through isolating resistor 120 to modulator 122. The imaginary component from integrator 29 is fed through isolating resistor 126 to modulator 128. Both of these modulators may be of the synchronous type described in the aforementioned article by R. L. Bright in the March 1955 AIEE Transactions. The reference voltage for modulator 122 is provided by A.-C. voltage source 130 while the reference voltage for modulator 128 is provided by reference source 131. These reference sources may provide voltages of any convenient frequency such as, for example, 400 cycles, but the output of voltage source 131 is in quadrature relationship with that of source 130. The A.-C. outputs of modulators 122 and 128, which are in quadrature with each other, are fed through resistor 136 and capacitor 137 and resistor 138 and capacitor 139, respectively. These signals are both fed through resistor 140 to summing amplifier 143 where they are added together. Feedback resistor 144 provides negative feedback from the output to the input of amplifier 143 to linearize this amplifier's response. The output of amplifier 143 is fed through bandpass filter 148 to rectifier 141. Bandpass filter 148 will pass the frequencies around the carrier frequency on which the signals are modulated but will filter out all higher frequency harmonics of the carriers. Rectifier 141, which may be a conventional diode rectifier, rectifies the combined real and imaginary components contained in the signal out of bandpass filter 148 and has as its output at terminal 45 a positive polarity D.-C. signal whose magnitude represents the vector sum of these two combined signals. The vector sum signal appearing at terminal 45 may be read on a positive reading voltmeter 49 or may be fed to appropriate readout circuitry utilized in conjunction with the servo analyzer.

Figure 3:
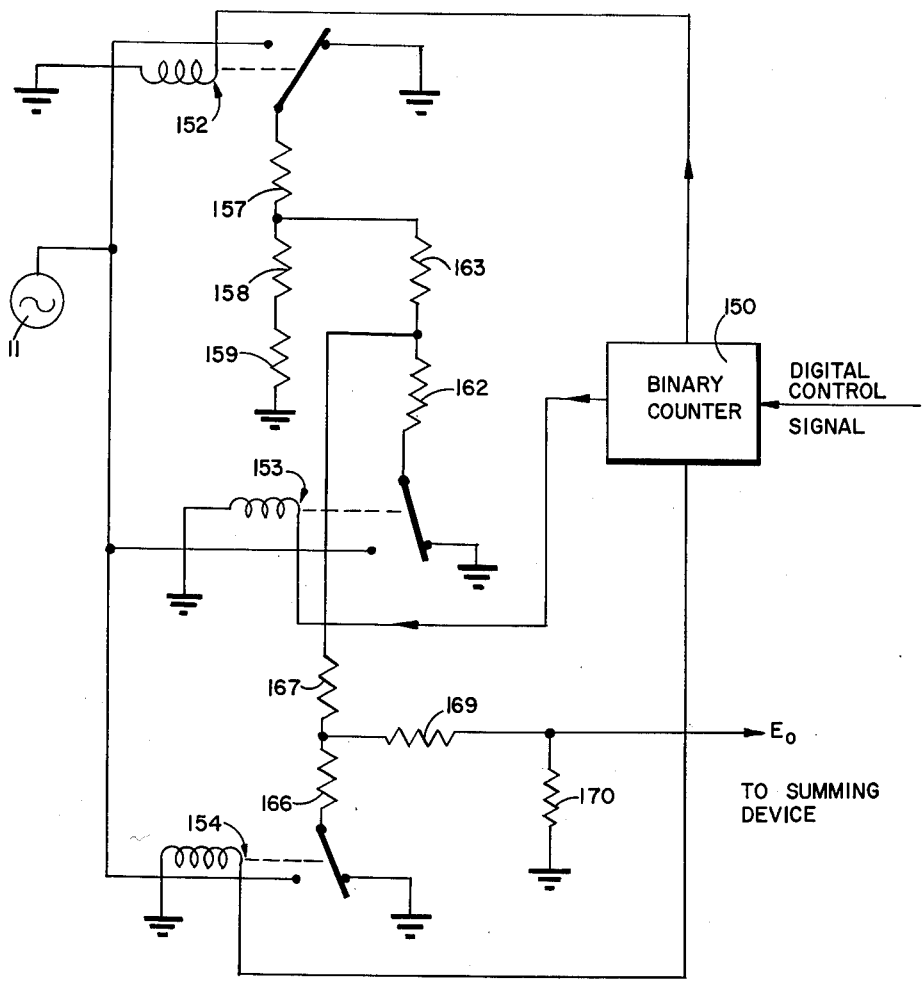
FIG. 3 is a schematic diagram of a digital-analog converter which may be used in the device of this invention.

Referring now to FIG. 3, a typical circuit which may be utilized as digital-analog converter 51 or digitally controlled attenuator 75 is illustrated. The circuitry of FIGURE 3 may be utilized where a digital control signal is available and it is desired to utilize this digital control signal to produce a proportionate analog output responsive thereto. The digital control signal, which either may be in binary coded form or may be a series of input pulses, is appropriately fed to binary counter 150. Counter 150, which may be of the conventional type utilizing Eccles-Jordan flip-flops, has a series of stages, the states of which represent the bit outputs of a binary signal. The binary counter may have as many stages or bits as application demands may dictate. For simplicity the bit outputs of only three of such stages are illustrated in FIG. 3, but obviously there may be (and in most instances probably would be) more than three bit outputs utilized in a given application. Each of the bit outputs of binary counter 150 is fed to a separate one of relays 152, 153 and 154. These relays are so connected to the binary counter bits so that when the associated bit is in the one or "on" condition, the connected relay will be actuated.

The movable arm of relay 152 is connected through resistors 157, 158 and 159 to ground. The movable arm of relay 153 is connected through resistors 162 and 163 to the junction of resistors 157 and 158. The movable arm of relay 154 is connected through resistors 166 and 167 to the junction between resistors 162 and 163. A further divider network is provided by resistors 169 and 170 which are connected between the junction of resistors 166 and 167 and ground.

The analog output signal, $e_0$ appears at the junction between resistors 169 and 170. The A.-C. reference voltage from which the output signal is derived is provided by A.-C. power source 11 which is connected to one of the fixed contacts of each of relays 152, 153 and 154. The other fixed contacts of each of these relays is connected to ground.

It can readily be seen that the resistance path from A.-C. source 11 to ground will be determined by the position of the movable contact of each of relays 152, 153 and 154. This resistive load is directly dependent upon the combination of the positions of these relays. The resistors forming this resistance path or load to ground should have predetermined resistances which will produce an analog output $e_0$ which is the desired function of the position of these relays. As already noted, each of these relays is either actuated or deactuated depending upon the state of the associated bit output of binary counter 150 which in turn is responsive to the digital control signal. Therefore, the resistive load to ground presented to A.-C. source 11 is responsive to the digital control signal. The magnitude and arrangement of this resistive load directly determines the amplitude of the output voltage $e_0$. In this manner, the amplitude of voltage $e_0$ is made to be a function of a digital control signal. Thus, digital to analog conversion may be accomplished, or the amount of attenuation of an input signal may be made responsive to a digital control signal. The values of resistors 157, 158, 159, 162, 163, 166, 167, 169 and 170 may be readily selected to meet application demands by one skilled in the art. Utilizing the same techniques as illustrated for the three stage device of FIG. 3, additional stages may be added to make the digital-analog converter or attenuator responsive to a digital control signal having as large a number of bits as application demands may dictate.

Referring now to FIG. 4, an interval timer which may be utilized with the device of this invention is illustrated. This interval timer, as already explained, is utilized to precisely control the time period of integration to a whole or integral number of cycles. It is to be noted that any time period of integration may be utilized as long as the test signal being utilized to check the servo system will divide into this time period a whole or integral number of times. If $f_m$ represents the frequency of the test signal, $N_c$ represents the number of cycles over which integration is to be accomplished and T represents the time period of integration then:

$$f_m = \frac{N_c}{T} \quad (13)$$

The interval timer illustrated in FIGURE 4 provides means for mechanizing this equation to provide a "start" control signal at the commencement of desired time interval T and a "stop" control signal at the end of time interval T. For illustrative purposes, to simplify the explanation of the operation of the interval timer, T will arbitrarily be set equal to ten seconds.

Relay 181 has two contacts, 104 and 105 which are normally closed and a third contact 182 which is normally opened. This relay is only actuated during the desired integration period of ten seconds. The integration command signal may be programmed by an appropriate automatic control or may be manually instigated. When the "commence integration" signal is given, relay 181 is actuated, closing contact 182 and opening contacts 104 and 105, the latter two contacts being connected across the integration capacitors 97 and 102 (see FIG. 2). Simultaneously, a digital control signal which represents the frequency of the test signal to be fed to the system under test is fed to digital comparator 186. This signal is the same digital control signal fed to digital-analog converter 51 to control the frequency of the test signal. The simultaneous feeding of the digital control signal and the integration command signal to the interval timer may be synchronized through the automatic control device used to operate the system or may be linked together to a signal manual control device. Digital comparator 186 should be of a type which will give a signal output when one input fed to it is greater than another. In this instance, there will be an output from digital comparator 186 when the digital control signal input is greater than that from binary counter 190. Digital comparator 186 may be any device which will produce this desired end result. An illustrative example of a binary digital comparator which may be utilized may be found in pending application, Serial No. 776,803, entitled "Binary Digital Comparator," Martin Rubin inventor, filed November 28, 1958.

Simultaneously, a counter reset signal is fed to binary counter 190 and binary divider 192. This signal resets binary counter 190 to 0 and binary divider 192 to 9. The counter reset signal may be automatically generated within the automatic control system or may be actuated by means associated with a manual control synchronized with that for the integration command signal and the digital control signal. The input digital control signal which represents the input test signal is greater than the output of binary counter 190 which is set to zero. Digital comparator 186 will therefore have an output which will actuate relays 195 and 196, and D.-C. power source 197 will be connected through the closed contact of relay 196 to movable contact arm 199. At the same time, power source 197 will be connected to the closed contact of relay 195 to the movable arms of relays 200 and 202.

Binary divider 192, which may be of the conventional ring counter type, divides by T which for illustrative purposes is made equal to 10. This divider 192 is set to 9, for purposes to be explained later on, rather than to zero by the counter reset signal. Cam switch 207 is mechanically coupled to shaft 22 which is in turn coupled to gear train 62 (see FIG. 2). Shaft 22 as already explained rotates in response to the digital control signal at the frequency of the test signal fed to the system under test. Cam switch 207 will therefore also rotate at this test frequency. Cam switch 207 has a projection 209 thereon which will drive movable contact 199 into engagement with fixed contact 212 when this projection strikes movable contact 199 with each complete rotation of cam switch 207. When this occurs for the first time, voltage will be fed from power source 197 through the contact of relay 196 and contacts 199 and 212 thence through contact 182, which is held closed by relay coil 181, to relay 200 thereby closing the contacts of this relay. With the relay contacts of relay 200 closed, power will be fed from power source 197 through the contacts of relay 195, which are held closed by the output from digital comparator 186, to relay 202 thereby actuating this relay and closing its contacts. Relay 202 self-latches due to the connection between its coil and its fixed contacts. Power is therefore supplied from power source 197 through the contacts of relay 202 to relays 210 and 211. The movable contacts 33 and 34 of relays 210 and 211 respectively are thereby ungrounded. By reference to FIG. 2 it can be seen that contacts 33 and 34 effectively short the input to integrators 96 and 101 respectively when they are grounded. The integration functions of these integrators are therefore commenced when these contacts are ungrounded by the action of relays 210 and 211 which is initiated by the first engagement of contacts 199 and 212 due to the action of cam switch 207.

As the projection 209 of cam 207 pushes contact 199 into engagement with contact 212, a pulse is generated which passes through the contact 182 of relay 181 to low pass filter 215. This pulse is passed through the differentiating network comprised by capacitor 216 and resistor 217 to one shot multivibrator 220. Low pass filter 215, the differentiating network and one shot multivibrator 220 form a pulse forming network which removes the noise in the signal which is inadvertently produced in the making and breaking of contacts 199 and 212. One shot multivibrator 220 has a sharp pulse as its output which is fed to binary divider 192.

For each complete rotation of cam switch 207 a pulse is generated which is fed to binary divider 192. As already noted, each of these pulses (except the first pulse which initiates the integration period) represents a single cycle of the test signal being fed to the system under test. Binary divider 192 provides an output pulse each time it goes from 9 to zero (for a divide by ten divider which is being described for illustrative purposes). This divider, 192 may be a conventional scale of ten ring counter having ten stages interconnected so that nine stages are in the "off" condition and one is in the "on" condition. A suitable ring counter is described in Patent No. 2,591,961 entitled "Transistor Ring Counter," issued April 8, 1952, R. P. Moore, Jr., et al., inventors. A first pulse output will be provided from binary divider 192 (which is set to 9 to binary counter 190, the first time movable contact 199 engages fixed contact 212. This first pulse initiates the count by binary counter 190. It is to be noted that this pulse is generated at the start of the first cycle and the initiation of the integration period. Binary counter 190 will receive an additional pulse from binary divider 192 for each succeedng ten cycles of the cam generated input signal. The output of binary counter 190, which is fed to digital comparator 186, will eventually become one greater than the digital control signal fed to the comparator and this will occur when the frequency signal input generated by cam switch 207 is actually coincidental with the digital control signal due to the fact that binary counter 192 was set to 9 rather than 0 and the initial pulse starts the count. When this occurs, the output of digital comparator 186 will change state to the "off" condition, thereby deactuating relays 195 and 196 and in turn removing the connection of power source 197 from movable contact 199 and the other relay contacts to which it is connected. This will cause relays 209, 202, 210, 211 to be deactuated and the integration period will be terminated with the grounding of movable contacts 33 and 34. Relay 181 is deenergized by appropriate removal of the integration command signal by the associated control equipment.

To further clarify the operation of this circuitry, let us assume an input signal having a frequency of 15 cycles per second. In ten seconds of integration such a signal will produce 151 pulses from cam switch 207 (the 10 second integration period being initiated with the first closing of contacts 199 and 212 by cam switch 207 which causes a pulse to be generated at the start of the first cycle). These pulses will cause binary divider 192 to produce 16 output pulses, one initiated by the first pulse from the cam switch and one pulse for each ten succeeding pulses from the cam switch. The digital control signal fed to digital comparator 186 is the binary coded signal for 15 (representing 15 cycles). When the binary coded signal from binary counter 190 becomes 16 with the arrival of the sixteenth pulse from binary divider 192, the digital comparator will receive an input from counter 190 which is greater than the digital control signal. This will, as already noted, cause comparator 186 to change state to the "off" condition deactuating the associated relays and terminating the integration at the end of the desired ten second period.

The interval timer illustrated in FIG. 4 thus provides means for precisely controlling the time period of integration to an integral number of cycles which is an integral multiple of the time period of integration.

The device of this invention, as can be seen, provides means for eliminating all of the D.-C. and harmonically related terms from a test signal to produce an output representative of the response of a servo system under test at the test frequency only. This is accomplished by multiplying the test signal by the output of the servo system under test which receives this test signal and then integrating this product over a whole or integral number of cycles.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Apparatus for analyzing the output of a system excited by a sinusoidal test signal comprising a multiplier having an output product signal and having said system output and test signals applied as inputs thereto, an integrator having said product signal applied as an input thereto, means for enabling said integrator, and means for subsequently disabling said integrator upon termination of a time interval equal to a whole number of cycles of said test signal.

2. A servo analyzer for checking the response of a servo system comprising a test signal generator, a multiplier, separate output signals from said signal generator being fed respectively to said multiplier and said servo system, the output of said servo system being fed to said multiplier for multiplication with the output signal from said signal generator, an integrator, the output of said multiplier being fed to said integrator, and an interval timer for controlling the period of integration of said integrator to an integral number of cycles of said generator output, said interval timer being responsive to the output of said test signal generator.

3. A servo analyzer for checking the response of a servo system comprising a test signal generator, a multiplier, separate output signals from said signal generator being fed respectively to said multiplier and said servo system, the output of said servo system being fed to said multiplier for multiplication with the output signal from said signal generator, an integrator, the output of said multiplier being fed to said integrator, and an interval timer for controlling the period of integration of said integrator to an integral number of cycles of said generator output, said interval timer being responsive to the output of said test signal generator, said interval timer comprising a cam switch responsive to the output of said test generator, a binary divider responsive to rotation of said cam switch, a binary counter connected to receive the output of said divider, a digital comparator connected to receive the output of said counter, and switch means for shorting out the input to said integrator from said multiplier in response to the output of said comparator.

4. A servo analyzer for checking the response of a servo system comprising means for generating a test signal which is a function of $\cos 2\pi f_m t$, said signal being fed to the servo system, means responsive to the output of said signal generating means for separately multiplying the output of the servo system by $\cos 2\pi f_m t$ and by $\sin 2\pi f_m t$, a pair of integrators, each of said separately multiplied signals being fed to a separate one of said integrators, and means for controlling the period of integration of both of said integrators to an integral number of cycles of said test signal fed to the servo system.

5. The device as recited in claim 4 wherein said means for controlling the period of integration is responsive to said test signal generating means.

6. A servo analyzer for checking the response of a servo system comprising means for generating a test signal which is a function of $\cos 2\pi f_m t$, said signal being fed to the servo system, means responsive to the output of said signal generating means for separately multiplying the output of the servo system by $\cos 2\pi f_m t$ and by $\sin 2\pi f_m t$, a pair of integrators, each of said separately multiplied signals being fed to a separate one of said integrators, means for controlling the period of integration of both of said integrators to an integral number of cycles of said test signal, and vector summing means responsive to the outputs of said first and second integrators for producing the vector sum of said outputs.

7. A device for analyzing the performance of a servo system comprising means for generating a test signal, said test signal being fed to the servo system, means responsive to said test signal generating means for multiplying the output of said servo system by a signal in phase with said test signal, means for integrating the in phase signal-servo system output product, and means for controlling the period of integration of said integrating means to an integral number of cycles of said test signal.

8. The device as recited in claim 7 wherein said means for integrating the in phase signal-servo system output product comprises a Miller electronic integrator and said means for controlling the period of integration is responsive to said test signal.

9. Apparatus for analyzing the performance of a system, said apparatus comprising first means for modulating at variable frequency a sinusoidal signal, second means applying said variable frequency modulated signal to said system to be analyzed, third means connected to detect the performance of said system in response to the application of said modulated signal, fourth means multiplying the signal provided by said third means with said modulated signal, fifth means connected to receive and integrate said multiplied signal, and sixth means for controlling the time period of integration of said multiplied signal by said integrating means.

10. A device for analyzing the performance of a servo system comprising means for generating a test signal, said test signal being fed to the servo system, means responsive to said test signal generating means for separately multiplying the output of said servo system by a signal in phase with said test signal and by a signal in quadrature relationship with said test signal, first means for integrating the in phase signal-servo system output product, second means for integrating the quadrature signal-servo system output product, means for controlling the periods of integration of said first and second integrating means, and vector summing means responsive to the outputs of said first and second integrating means for producing the vector sum thereof.

11. A servo analyzer for analyzing the performance of a servo system comprising means for generating a test signal, said means having both electrical and mechanical outputs, said electrical output being fed to said servo system being analyzed, a multiplication resolver having a rotatable shaft and a winding mechanically coupled to said shaft, said multiplication resolver further having a fixedly mounted input winding, the output of said servo system being fed to said fixedly mounted input winding, the mechanical output of said test signal generating means being coupled to the rotatable shaft of said multiplication resolver, a demodulator, the output of said shaft coupled resolver coil being fed to said demodulator, an integrator, the output of said demodulator being fed to said integrator, and interval timer means mechanically coupled to said integrator for controlling the period of integration thereof, said interval timer means being responsive to the mechanical output of said test signal generating means.

12. The device as recited in claim 11 wherein said interval timer comprises a cam switch coupled to receive the mechanical output of said test signal generating means, a binary divider responsive to complete rotations of said cam switch, a binary counter responsive to the output of said binary divider, a digital comparator connected to receive the output of said binary counter, and switch means for shorting out the input to said integrator from the demodulator in response to the ouput of said comparator.

13. In combination, an integrator and means for controlling the integration period of said integrator in response to a digital test signal comprising a rotatable cam switch, said cam switch being rotatable in response to said test signal, said cam switch having a pair of contacts which alternately engage and disengage in response to rotation of said cam switch, a power source, said power source being connected to one of said cam switch contacts, a binary divider, the other of said cam switch contacts being coupled to said binary divider, a binary counter connected to receive the output of said binary divider, a digital comparator, the output of said binary counter and said digital test signal being fed to said comparator for comparison, first and second relays responsive to the output of said comparator, the contacts of said first relay being connected in series circuit between said power source and said one of said cam switch contacts, and a third relay for shorting the input to said integrator in response to an actuation signal from said power source, the contacts of said second relay being connected between said power source and the coil of said third relay.

14. A servo analyzer for analyzing the performance of a servo system comprising means for generating a test signal, said means having both electrical and mechanical outputs, said electrical output being fed to said servo system being analyzed, a multiplication resolver having a rotatable shaft and a pair of windings arranged in quadrature relationship with respect to each other, said windings being mechanically coupled to said rotatable shaft, said multiplication resolver further having a fixedly mounted input winding, the output of said servo system being fed to said fixedly mounted input winding, the mechanical output of said test signal generating means being coupled to the rotatable shaft of said multiplication resolver, first and second demodulators, the outputs of each of said shaft coupled resolver coils being fed to a separate one of said demodulators, a pair of integrators, the outputs of each of said demodulators being fed to a separate one of said integrators, interval timer means coupled to each of said integrators for controlling the period of integration thereof, said interval timer means being responsive to the mechanical output of said test signal generating means, and a vector summing network, the outputs of said integrators being fed to said vector summing network.

15. A servo analyzer for analyzing the performance of a servo system comprising means for generating a test signal, said means having both electrical and mechanical outputs, said electrical output being fed to said servo system being analyzed, a multiplication resolver having a rotatable shaft and a pair of windings arranged in quadrature relationship with respect to each other, said quadrature related windings being mechanically coupled to the rotatable shaft of said resolver, said multiplication resolver further having a fixedly mounted input winding, the output of said servo system being fed to said fixedly mounted input winding, the mechanical output of said test signal generating means being coupled to the rotatable shaft of said multiplication resolver, first and second integrators, the outputs of each of said shaft coupled resolver coils being fed to a separate one of said integrators, and interval timer means mechanically coupled to each of said integrators for controlling the period of integration thereof, said interval timer means being responsive to the mechanical output of said test signal generating means.

16. A device for analyzing the performance of a servo system comprising means for generating an electrical test signal and a mechanical signal of the same frequency as said electrical signal, said electrical test signal being fed to said servo system, means responsive to the mechanical output of said test signal generating means for separately multiplying the output of said servo system by a signal in phase with said servo system output and by a signal in quadrature relationship with said servo systems output, first integrating means for integrating the in phase multiplied signals, second integrating means for integrating the quadrature related multiplied signals, an interval timer connected to control the period of integration of said first and second integrating means, said interval timer being responsive to the mechanical output of said test signal generating means, and a vector summing network comprising a pair of modulators, said modulators being driven by separate carrier voltages, one of said carrier voltages being in quadrature relationship with the other of said carrier voltages, the outputs of each of said integrating means being fed to a separate one of said modulators as the modulating voltage therefor, said vector summing network further comprising a summing amplifier, the outputs of said modulators being fed to said summing amplifier.

17. A device for analyzing the performance of a servo system comprising means for generating an electrical test signal and a mechanical signal of the same frequency as said electrical signal, said electrical test signal being fed to said servo system, means responsive to the mechanical output of said test signal generating means for separately multiplying the output of said servo system by a signal in phase with said servo system output and by a signal in quadrature relationship with said servo systems output, first integrating means for integrating the in phase multiplied signals, second integrating means for integrating the quadrature related multiplied signals, an interval timer connected to control the period of integration of said first and second integrating means, said interval timer being responsive to the mechanical output of said test signal generating means, and a vector summing network comprising a pair of modulators, said modulators being driven by separate carrier voltages, one of said carrier voltages being in quadrature relationship with the other of said carrier voltages, the outputs of each of said integrating means being fed to a separate one of said modulators as the modulating voltage therefor, said vector summing network further comprising a summing amplifier, a band pass filter tuned to the carrier frequency of said modulators, and a demodulator, the outputs of said modulators being fed to said summing amplifier, the output of said summing amplifier being fed to said band pass filter, and the output of band pass filter being fed to said demodulator, the output of said demodulator being the vector sum of the integrated signals fed to said vector summing network.

References Cited in the file of this patent

UNITED STATES PATENTS

| | | |
|---|---|---|
| 2,752,092 | Desoer | June 26, 1956 |
| 2,754,169 | Richardson | July 10, 1956 |
| 2,776,395 | Leonard | Jan. 1, 1957 |
| 2,837,718 | Catherall | June 3, 1958 |
| 2,953,743 | McDonal | Sept. 30, 1960 |
| 2,958,822 | Rogers | Nov. 1, 1960 |

OTHER REFERENCES

"A Fourier Analyzer," The Review of Scientific Instruments, volume 24, No. 4; April 1953, pages 272–276.